United States Patent
Ho et al.

(10) Patent No.: US 10,007,356 B2
(45) Date of Patent: Jun. 26, 2018

(54) CHART DUAL-Y RESIZE AND SPLIT-UNSPLIT INTERACTION

(71) Applicant: Oracle International Corporation, Redwood Shores, CA (US)

(72) Inventors: Pangus Ho, Cambridge, MA (US); Hugh Zhang, Winchester, MA (US); Prashant Singh, Lexington, MA (US); Tamika Tannis, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days. days.

(21) Appl. No.: 15/285,368

(22) Filed: Oct. 4, 2016

(65) Prior Publication Data
US 2017/0024016 A1    Jan. 26, 2017

Related U.S. Application Data

(63) Continuation of application No. 14/490,406, filed on Sep. 18, 2014, now Pat. No. 9,471,152.

(51) Int. Cl.
| | |
|---|---|
| *G06F 3/01* | (2006.01) |
| *G06T 11/60* | (2006.01) |
| *G06F 17/30* | (2006.01) |
| *G06T 11/20* | (2006.01) |
| *G06F 3/0486* | (2013.01) |
| *G06F 3/0481* | (2013.01) |
| *G06F 3/0484* | (2013.01) |
| *G06T 3/40* | (2006.01) |

(52) U.S. Cl.
CPC ............ *G06F 3/017* (2013.01); *G06F 3/0481* (2013.01); *G06F 3/0486* (2013.01); *G06F 3/04847* (2013.01); *G06F 17/30991* (2013.01); *G06T 3/40* (2013.01); *G06T 11/203* (2013.01); *G06T 11/206* (2013.01); *G06T 11/60* (2013.01); *G06F 3/04845* (2013.01); *G06F 2203/04808* (2013.01); *G06T 11/20* (2013.01); *G06T 2200/24* (2013.01); *G06T 2200/28* (2013.01); *G06T 2207/30176* (2013.01)

(58) Field of Classification Search
CPC ...... G06T 11/203; G06T 11/206; G06T 11/20; G06T 11/60; G06T 2200/24; G06T 2207/30176; G06F 17/30991; G06F 2203/04808; G06F 3/017; G06F 3/0481; G06F 3/04847; G06F 3/0486
USPC .................................................. 345/440, 666
See application file for complete search history.

(56) References Cited

U.S. PATENT DOCUMENTS

| | | | |
|---|---|---|---|
| 2005/0035966 A1 | 2/2005 | Pasquarette et al. | |
| 2005/0099423 A1* | 5/2005 | Brauss | G06T 11/206 345/440 |
| 2006/0106509 A1* | 5/2006 | Robb | G05B 23/0216 701/29.1 |

(Continued)

OTHER PUBLICATIONS

U.S. Appl. No. 14/490,406, Non-Final Office Acton dated Jan. 14, 2016, 19 pages.

(Continued)

*Primary Examiner* — Jin-Cheng Wang
(74) *Attorney, Agent, or Firm* — Kilpatrick Townsend & Stockton LLP

(57) ABSTRACT

Systems and methods are disclosed that, in various embodiments, improve chart performance by allowing users to interactively split and unsplit charts with dual-Y axis using dragging gestures or a button.

9 Claims, 13 Drawing Sheets

(56) References Cited

U.S. PATENT DOCUMENTS

| | | |
|---|---|---|
| 2006/0206512 A1 | 9/2006 | Hanrahan et al. |
| 2010/0056128 A1* | 3/2010 | Hwang ................... G10L 21/06 |
| | | 455/418 |
| 2010/0235771 A1* | 9/2010 | Gregg, III ............. G06T 11/206 |
| | | 715/769 |
| 2014/0068485 A1 | 3/2014 | El-Jayousi et al. |
| 2014/0092095 A1 | 4/2014 | Higgins et al. |
| 2015/0178963 A1 | 6/2015 | Lu |
| 2015/0254369 A1 | 9/2015 | Hou et al. |
| 2015/0262396 A1* | 9/2015 | Devarajan ......... G06F 17/30554 |
| | | 345/440.1 |
| 2016/0085309 A1 | 3/2016 | Ho et al. |

OTHER PUBLICATIONS

U.S. Appl. No. 14/490,406, Notice of Allowence dated Jun. 22, 2016, 14 pages.

\* cited by examiner

CHART DUAL-Y RESIZE AND SPLIT-UNSPLIT INTERACTION

CROSS-REFERENCE TO RELATED APPLICATION

This application is a continuation of, and claims the benefit and priority of application Ser. No. 14/490,406, filed Sep. 18, 2014, entitled "CHART DUAL-Y RESIZE AND SPLIT-UNSPLIT INTERACTION," the entire contents of which are incorporated herein by reference for all purposes.

BACKGROUND OF THE INVENTION

An Application Development Framework (ADF) provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Oracle Application Development Framework is one example of an ADF that utilizes this design pattern.

Oracle ADF includes libraries of standards-based Java Server Faces (JSF) components with built-in HTML5 and Ajax functionality. With these components, web deployed user interfaces can be developed with a level of functionality and interactivity previously reserved for thick-client applications. The components offer data interaction, data visualization, and encapsulated browser side operations in a set of easy to use components that makes rich client application development easier than ever. Oracle ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

Most modern computer applications, including Oracle ADF, incorporate a variety of reporting and chart tools. Line and area charts are often used to visualize a huge amount of data, such as a stock chart that displays the daily stock price over a period of over 10 years.

Accordingly, what is desired is to solve problems relating to improving chart performance, some of which may be discussed herein. Additionally, what is desired is to reduce drawbacks relating to modern cloud-based applications that employ chart functionality, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In certain embodiments, an application development framework provides tools that allows developers to create applications for which a chart user can interactively switch between formats by dragging gestures. Accordingly, the user experience is enhanced as quicker access is provided to chart formats which each give distinct ways to compare metrics. The application development framework further incorporates a design that allows developers to include charts with interactive resizing. Accordingly, plot areas can be interactively resized in a split format.

In one embodiment, a dual-Y chart can be created using first data set and a second data set. A first chart layout is determined for the first data set and the second data set. The first chart layout can have a plot area with a shared X-axis and a dual-Y axis. A gesture performed by a user with respect to a chart having the first chart layout is received. A source of the gesture with respect to the chart is determined as wells as a target of the gesture with respect to the chart. A second chart layout is determined for the first data set and the second data set based on the source and target of the gesture. The second chart layout can have a first plot area sharing an X-axis with a second plot area. The chart can then be rendered with the second chart layout.

In certain embodiments, determining the first chart layout for the first data set and the second data set may includes determining an unsplit dual-Y layout. Receiving the gesture performed by the user with respect to the chart having the first chart layout can include a variety of gestures including receiving a drag and drop motion. Determining the source of the gesture with respect to the chart can include identifying a first Y-axis in the dual-Y axis.

In further embodiments, determining the target of the gesture with respect to the chart can include identifying an axis label or title of the chart. Determining the second chart layout for the first data set and the second data set based on the source and target of the gesture can include determining a split unipolar dual-Y chart layout. Determining the second chart layout for the first data set and the second data set based on the source and target of the gesture can include determining a split bi-polar dual-Y chart layout.

In some embodiments, a visual indicator is generated in response to identifying the source or target of the gesture. In one aspect, a second gesture can be received with respect to the chart having the second chart layout. Resizing information may be determined based on the second gesture. The chart may be rendered with a third chart layout generated based on the resizing information.

In one embodiment, a non-transitory computer-readable medium includes a computer program product which when executed by a processor of a computer causes the processor to receive a first data set; receive a second data set; determine a first chart layout for the first data set and the second data set, the first chart layout having a plot area with a shared X-axis and a dual-Y axis; receive a gesture performed by a user with respect to a chart having the first chart layout; determine a source of the gesture with respect to the chart;

determine a target of the gesture with respect to the chart; determine a second chart layout for the first data set and the second data set based on the source and target of the gesture, the second chart layout having a first plot area sharing an X-axis with a second plot area; and render the chart with the second chart layout.

In one embodiment, a chart rendering system can include a hardware processor and a memory storing a set of instructions which when executed by the processor causes the processor to receive a first data set; receive a second data set; determine a first chart layout for the first data set and the second data set, the first chart layout having a plot area with a shared X-axis and a dual-Y axis; receive a gesture performed by a user with respect to a chart having the first chart layout; determine a source of the gesture with respect to the chart; determine a target of the gesture with respect to the chart; determine a second chart layout for the first data set and the second data set based on the source and target of the gesture, the second chart layout having a first plot area sharing an X-axis with a second plot area; and render the chart with the second chart layout.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Figure 1:
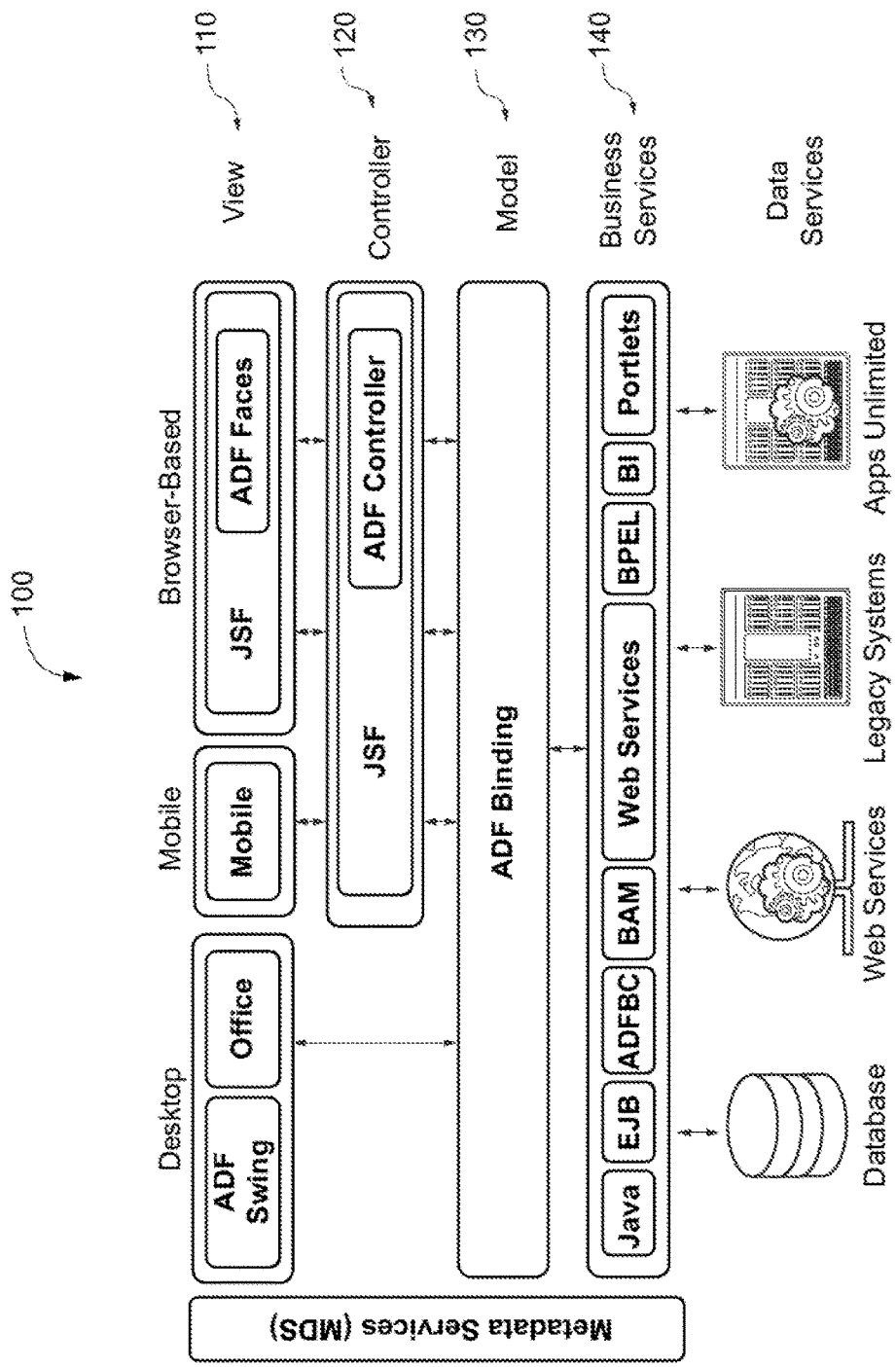
FIG. 1 is a block diagram illustrating an application development framework (ADF) in one embodiment according to the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Introduction

Java EE is a standard, robust, scalable, and secure platform that forms the basis for many of today's enterprise applications. Java EE provides a set of specifications for building multi-tier applications using the Java language. In the past, there was a direct correlation between the robust nature of an application to the complexity required to achieve it. However, with the advent of ADFs, such as Oracle ADF, the implementation of extremely rich Java EE applications can be provided by adhering to standard patterns and practices with greatly reduced effort.

With the increased need for organizations to build composite applications that utilize Service Oriented Architecture (SOA) principles, developers are forced to create applications that are extremely agile. Implementing these best practices in agile applications usually involves writing a significant amount of infrastructure code, adding another obstacle for developers building their first Java EE application. In addition to providing robust, performant, and maintainable applications—Oracle ADF provides the infrastructure code to implement agile SOA based applications thereby removing the effort involved in an organization "rolling their own."

Oracle ADF further provides a visual and declarative approach to Java EE development through the Oracle JDeveloper 11g development tool. Oracle ADF implements the Model-View-Controller design pattern and offers an integrated solution that covers all the layers of this architecture with solution to such areas as Object/Relational mapping, data persistence, reusable controller layer, rich Web user interface framework, data binding to UI, security and customization. Extending beyond the core Web based MVC approach, ADF also integrates with the Oracle SOA and WebCenter Portal frameworks simplifying the creation of complete composite applications.

For example, Oracle ADF makes it easy to develop agile applications that expose data as services by coupling a service interface to the built-in business services in ADF. This separation of business service implementation details is performed in Oracle ADF via metadata. Use of this metadata-driven architecture enables application developers to focus on the business logic and user experience, rather than the details of how services are accessed.

Oracle ADF stores the implementation details of these services in metadata in the ADF Model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

FIG. 1 is a block diagram illustrating application development framework (ADF) 100 in one embodiment according to the present invention. FIG. 1 is a simplified illustration of a system that may incorporate various embodiments or implementations of the one or more inventions presented within this disclosure. FIG. 1 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADF 100 may be embodied as Oracle ADF is one example. Accordingly, ADF 100 is based on a Model-View-Controller (MVC) design pattern. An MVC application is separated into: 1) a model layer that handles interaction with data-sources and runs the business logic, 12) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In this embodiment, modules forming an enterprise application are shown as being within ADF 100 to represent that the modules are developed using ADF and then executed within the context of ADF 100. For conciseness, the various internal details of ADF are not shown assuming that the application is developed using the JAVA programming language and Oracle ADF available as part of JDeveloper 10.1.3, a development tool available from Oracle Corporation. However, the features of the present invention described below may be implemented using any desired combination of programming language and application development framework as will be apparent to one skilled in the relevant arts by reading the disclosure provided herein.

In various embodiments, ADF 100 an application to be developed in the form of multiple layers, each layer containing code modules/files implementing desired logic according to pre-defined specification. Thus, in one embodiment, ADF 100 enables the application to be developed as four layers: view layer 110 containing code modules/files that provide the user interface of the application, controller layer 120 containing code modules that control the flow of the application, model layer 130 containing data/code modules that provide an abstraction layer for the underlying data, and business services layer 140 containing code modules that provide access to data from various sources and handles business logic.

Oracle ADF lets developers choose the technology they prefer to use when implementing each of the layers. FIG. 1 shows various options available for developers when building Oracle ADF applications. The glue that integrates the various components of Java EE applications and makes development so flexible is the Oracle ADF model layer. EJB, Web Services, JavaBeans, JPA/EclipseLink/TopLink objects, and many others can all be used as Business Services for the Oracle ADF Model. View layers can include Web based interfaces implemented with JSF, Desktop Swing applications and MS Office front ends, as well as interfaces for mobile devices.

It may be appreciated that the development of the application using such a layered approach often simplifies maintenance and reuse of components/code modules across various applications. Further, the independence of each layer from the other layers results in a loosely coupled service oriented architecture (SOA), which may be desirable when deploying the developed business/enterprise application on multiple/different systems.

In one aspect, view layer 110 represents the user interface of the application being developed. View layer 110 is shown with desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. Oracle ADF support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADF 100. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

Controller layer 120 contains code modules/files that control the flow of the application. Each controller object contains software instructions and/or data implemented according to a desired manner of presenting information in view layer 110. The desired manner may include the specific web pages to be displayed when links in another web page are clicked/selected by the user, the page to be displayed when errors occur during execution, indicating the specific data to be stored/retrieved, etc.

In one aspect, controller layer 120 manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming controller layer 120 are often implemented as Java servlets receiving the client requests and sending desired web pages as corresponding responses. Controller objects may also be implemented, for example, as Apache Jakarta Struts controllers or according to the JSF standard.

Model layer 130 contains data/code modules that connect various business services to the objects that use them in the other layers, such as to the controller objects discussed above or directly to desktop applications as shown. Each abstract data objects of model layer 130 provides a corresponding interface that can be used to access any type of business service, executing in underlying business service layer 140. The data objects may abstract the business service implementation details of a service from a client and/or expose data control methods/attributes to view components, providing a separation of the view and data layers.

In one aspect, model layer 130 consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

Oracle ADF emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, business services layer 140 manages interaction with a data persistence layer. It provides such services as data persistence, object/relational mapping, transaction management, and business logic execution. The Business Services layer in Oracle ADF can be implemented in any of the following options: As simple Java classes, EJB, Web services, JPA objects, and Oracle ADF Business Components. In addition, data can be consumed directly from files (XML or CSV) as well as REST.

Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of business services layer 140 contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Dual-Y Charts

Data analysis users have long ago determined that providing a graphical representation of the data can greatly assist in understanding more about the data. For example, pie charts, bar charts, and the like provide an informative visualization as to characteristics about the data. Such representations can be found in applications that allow the user to select sets of data and to then represent the data as a chart, for example.

In various embodiments, charts and other visualization can include a pie chart, a bar chart, a scatter chart, a column chart, a line chart, an area chart, a doughnut chart, a radar chart, a surface chart, a bubble chart, or a stock chart. Systems and methods are disclosed that, in various embodiments, improve chart performance by allowing users to interactively split and unsplit charts with dual-Y axis using dragging gestures or a button.

Figure 2A:
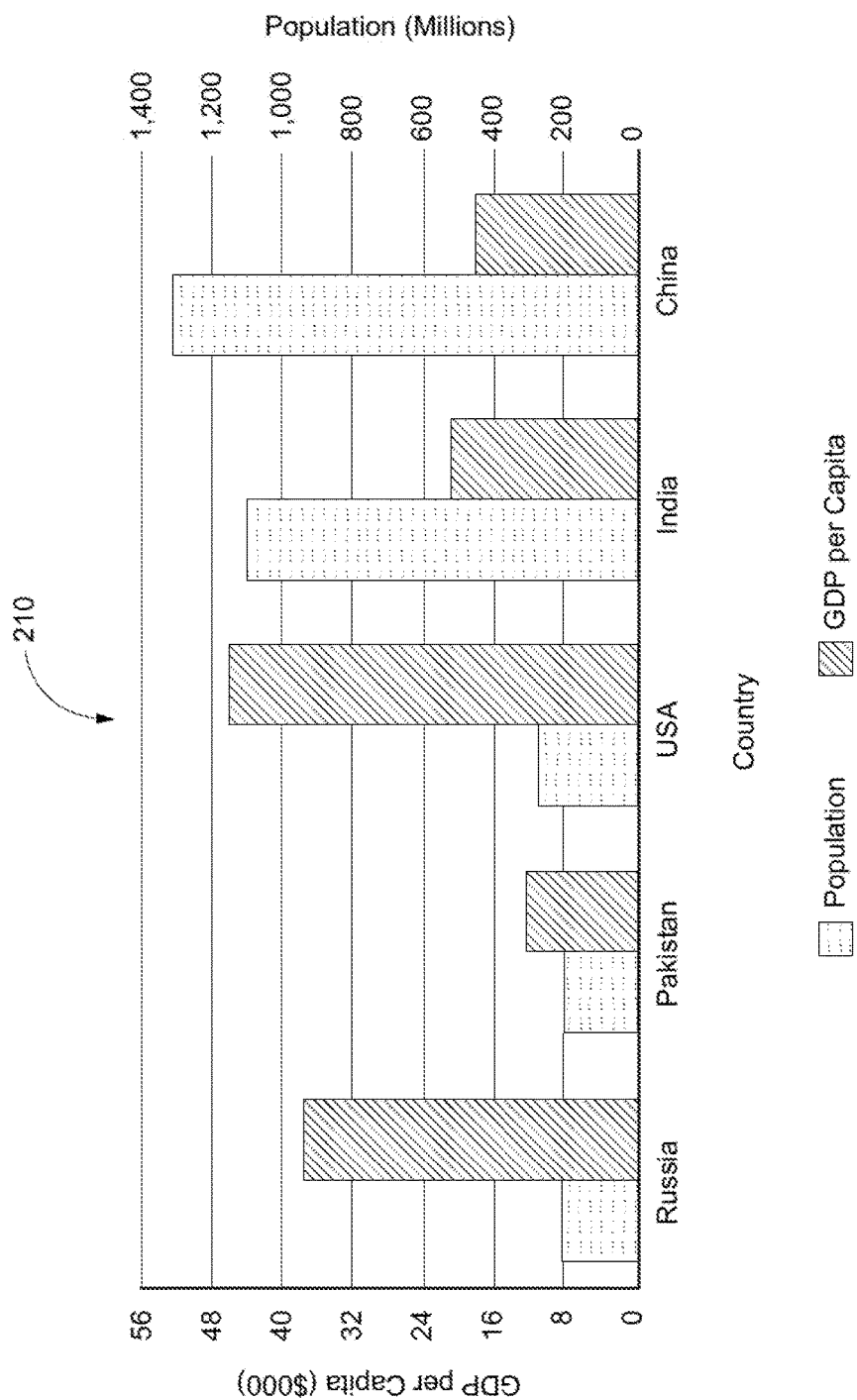
FIGS. 2A, 2B, and 2C are illustrations of dual-Y charts.
Figure 2B:
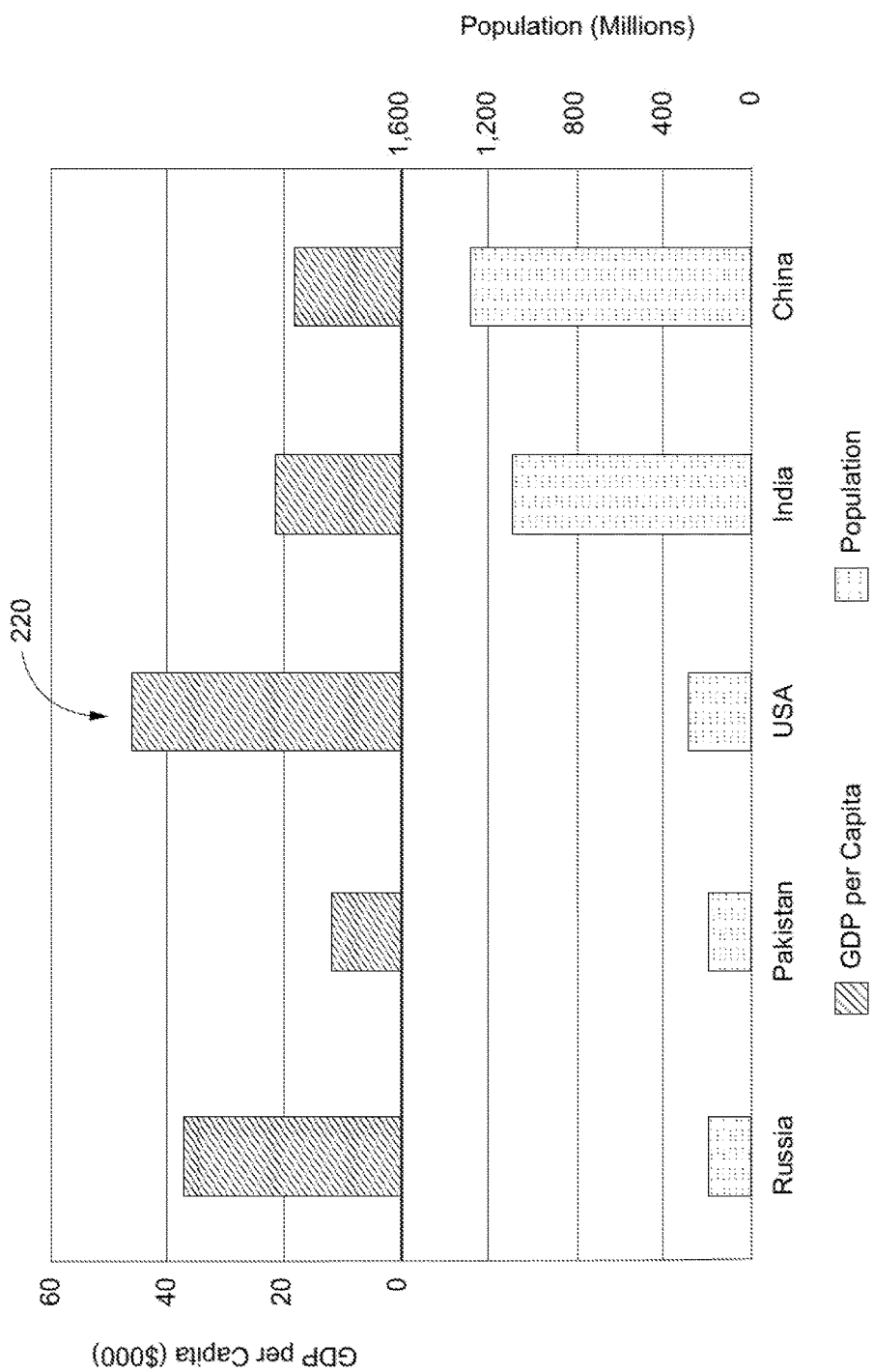
Figure 2C:
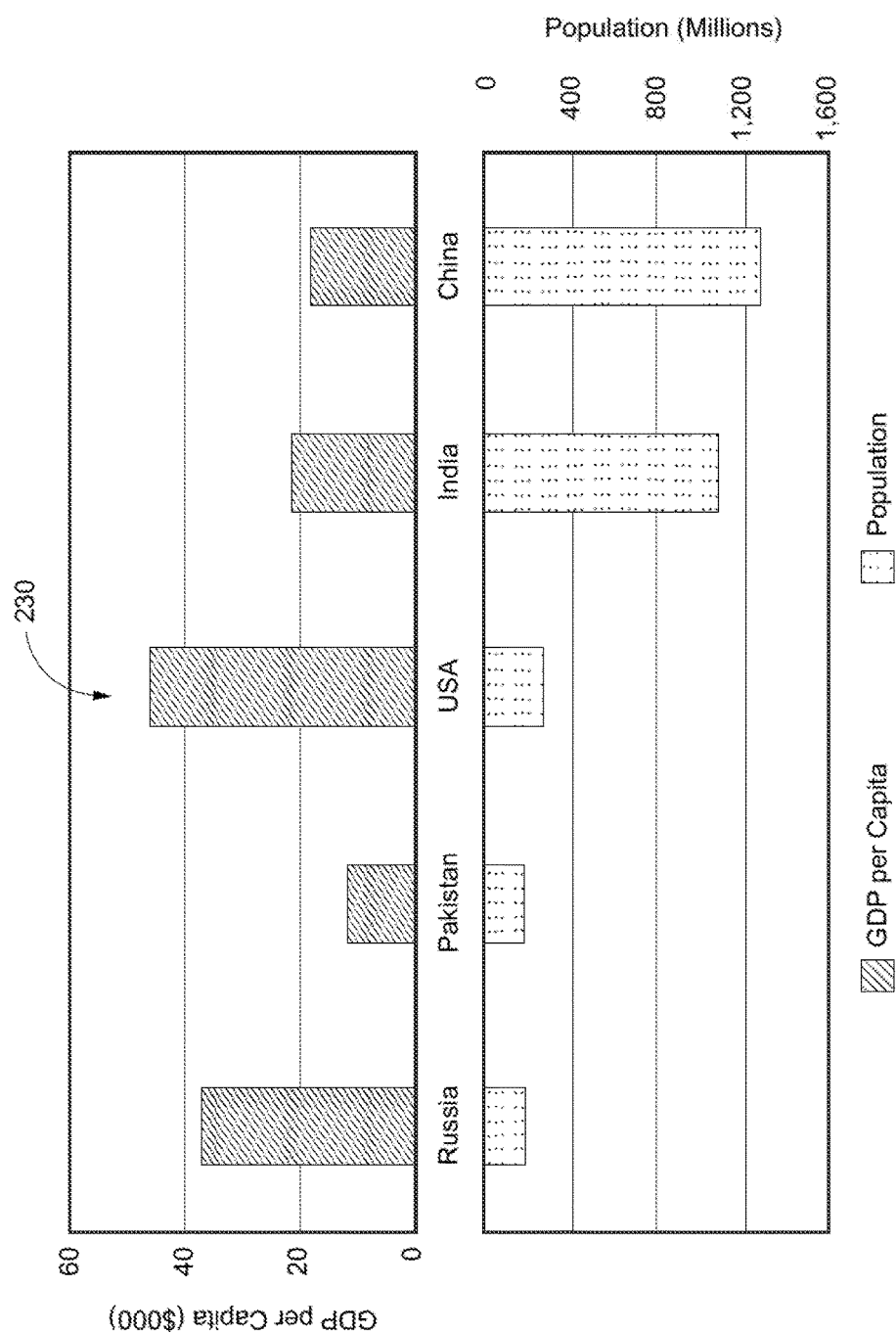

Charts with dual-Y axis are useful in showing related series with two different metrics. Such charts have two Y-axes and a shared categorical X-axis. Typically, there are three ways to display a dual-Y chart. First, both series can be displayed in the same plot area. The first Y-axis may be drawn on the left and the second Y-axis may be drawn on the right. This view is called a "Joined Dual-Y" as depicted in FIG. 2A with chart 210. In another example, both series can be displayed in two plot areas. For this, one may be placed on top of the other (or one beside the other if the chart is horizontal). The shared X-axis may be drawn at the bottom of the chart. Both series may grow in the same direction (from bottom to top). This view is called a "Split Unipolar Dual-Y" as depicted in FIG. 2B with chart 220. Finally, both series can be displayed in two plot areas similar to the "Split Unipolar Dual-Y." The top series may grow from bottom to top while the bottom series may grow from top to bottom. The shared X-axis can be drawn between the two plot areas. This view is call a "Split Bipolar Dual-Y" as depicted in FIG. 2C with chart 230.

The three formats described above provide different ways to compare two metrics that are assigned to the Y1 and the Y2 axis respectively. It can be useful for a user to switch between formats interactively while reading the chart. However, the industry so far has forced application developers to display the chart in just one of the three formats above as opposed to allowing the chart user to switch between formats.

In certain embodiments, ADF 100 provides tools that allows developers to create applications for which a chart user can interactively switch between the three above formats by dragging gestures. Accordingly, the user experience is enhanced as the quicker access is provided to the three formats which each give distinct ways to compare two metrics. ADF 100 further incorporates a design that allows developers to include charts with interactive resizing. Accordingly, two plot areas can be interactively resized in the split format. In prior industry solutions, the area is typically formatted as a split 50-50.

In one aspect, a chart users is given a choice of how to effectively view dual-Y datasets in various situations. The resize feature allows a split chart to be read more easily in a limited space (e.g., mobile devices) since a user can choose to focus the chart on just one metric. A drag-to-change-format feature allows data to be analyzed from more perspectives, aiding data comprehension.

Techniques as disclosed in certain embodiments are applicable to any chart that supports split dual-Y axis, such as Google Finance stock chart and Crystal Graphics PowerPlugs charts.

Dual-Y Chart Split-Unsplit Interaction

Figure 3:
FIG. 3 is a flowchart of a method for interacting with a dual-Y chart in one embodiment according to the present invention.

FIG. 3 is a flowchart of method 300 for interacting with a dual-Y chart in one embodiment according to the present invention. Implementations or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, data is received that is intended to be placed in a chart. The data can be obtained from a variety of source, such as files, databases, spreadsheets, or the like. In step 330, the data is placed in a first layout. For example, chart 210 represents a joined chart in a vertical layout, with a shared X-axis at the bottom and a Y1-axis on the left and a Y2-axis on the right. In step 340, a gesture is received. A gesture as used herein refers to one or more user interactions with the chart. A gesture may include one or more dragging motions, dropping motions, mouse or keyboard events, and the like or combinations thereof.

In step 350, a second layout is determined based on the gesture. Some examples of gestures and corresponding layouts that are possible include the following. A gesture that drags the Y2-axis (i.e., the axis labels or title) and drops it above the plot area may produce a split unipolar chart (Y2-axis at the top, Y1-axis at the bottom). A gesture that drags the Y2-axis and drops it below the plot area may produce a split bipolar chart (Y2-axis at the bottom and growing downwards, Y1-axis at the top). A gesture that drags the Y1-axis and drops it above the plot area may produce a split unipolar chart (Y1-axis at the top, Y2-axis at the bottom). A gesture that drags the Y1-axis and drops it below the plot area may produce a split bipolar chart (Y1-axis at the bottom and growing downwards, Y2-axis at the top).

In step 360, the data is placed in the second layout. Once the data has been placed in the second layout (e.g., the dual-Y chart is split), ADF 100 enables the user to perform one or more additional gestures, such as re-joining the chart or resizing the chart. In one example, a gesture begins by a chart user grabbing or dragging one of the two Y-axes. The chart user can drop the axis in the plot area of the other Y-axis. ADF 100 causes the data to be placed in the first layout (e.g., to join the chart). Method 300 ends in step 370.

Figure 4:
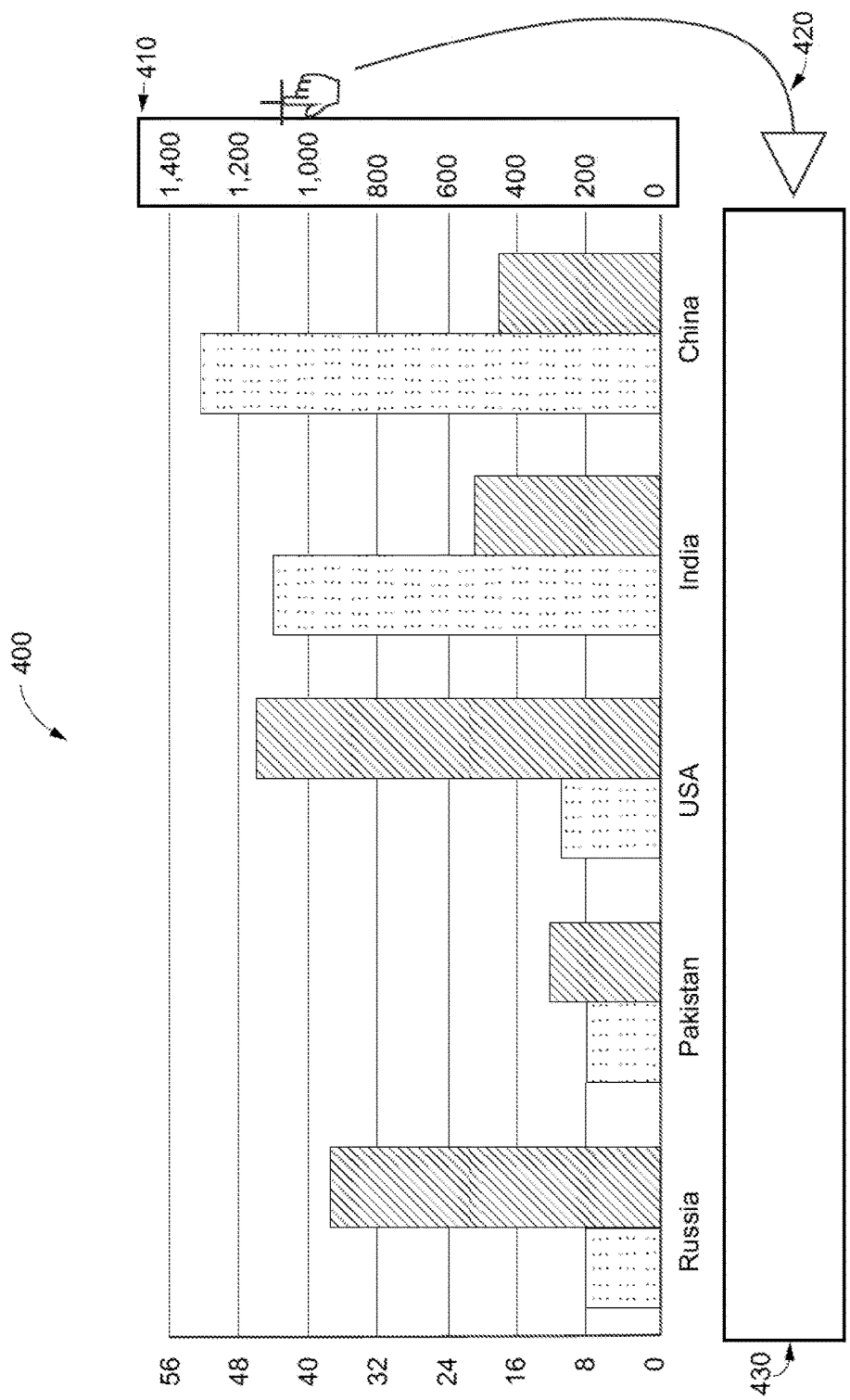
FIG. 4 is an illustration of one or more visual indicators associated with a dual-Y chart as a user performs a gesture while interacting with chart in one embodiment.
Figure 5:
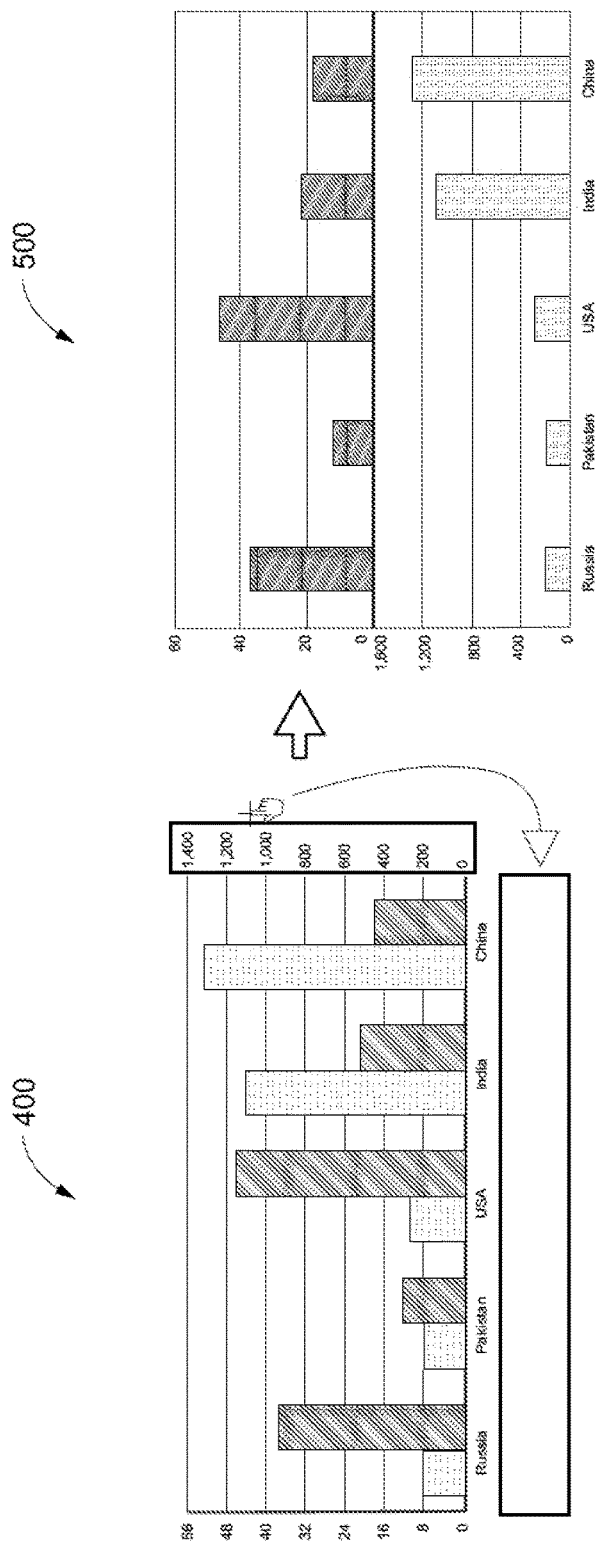
FIG. 5 is an illustration of a transformation of a dual-Y as a user performs a gesture while interacting with the chart in one embodiment.

FIG. 4 is an illustration of one or more visual indicators associated with chart 400 as a user performs a gesture while interacting with chart 400 in one embodiment. In this example, a gesture that begins by a drag of the Y2-axis causes ADF 100 to highlight or otherwise cause the axis labels or title to be visually distinguished from before using box 410. As the user performs the gesture following the motion indicated by curve 420, when the gesture approaches a target (such as the bottom of the chart in this example), ADF 100 causes the target to be visually distinguished from before using box 430. Different shapes, colors, icons, and visual indicators can be used to communicate to the user a source or target of a gesture. When the user drops the axis labels or title (or a representation thereof) below the plot area to complete the gesture, ADF 100 produces the split bipolar chart (Y2-axis at the bottom and growing downwards, Y1-axis at the top) as shown in FIG. 2B. FIG. 5 is an illustration of a transformation of chart 400 to chart 500 as a user performs a gesture while interacting with chart 400 in one embodiment.

Figure 6:
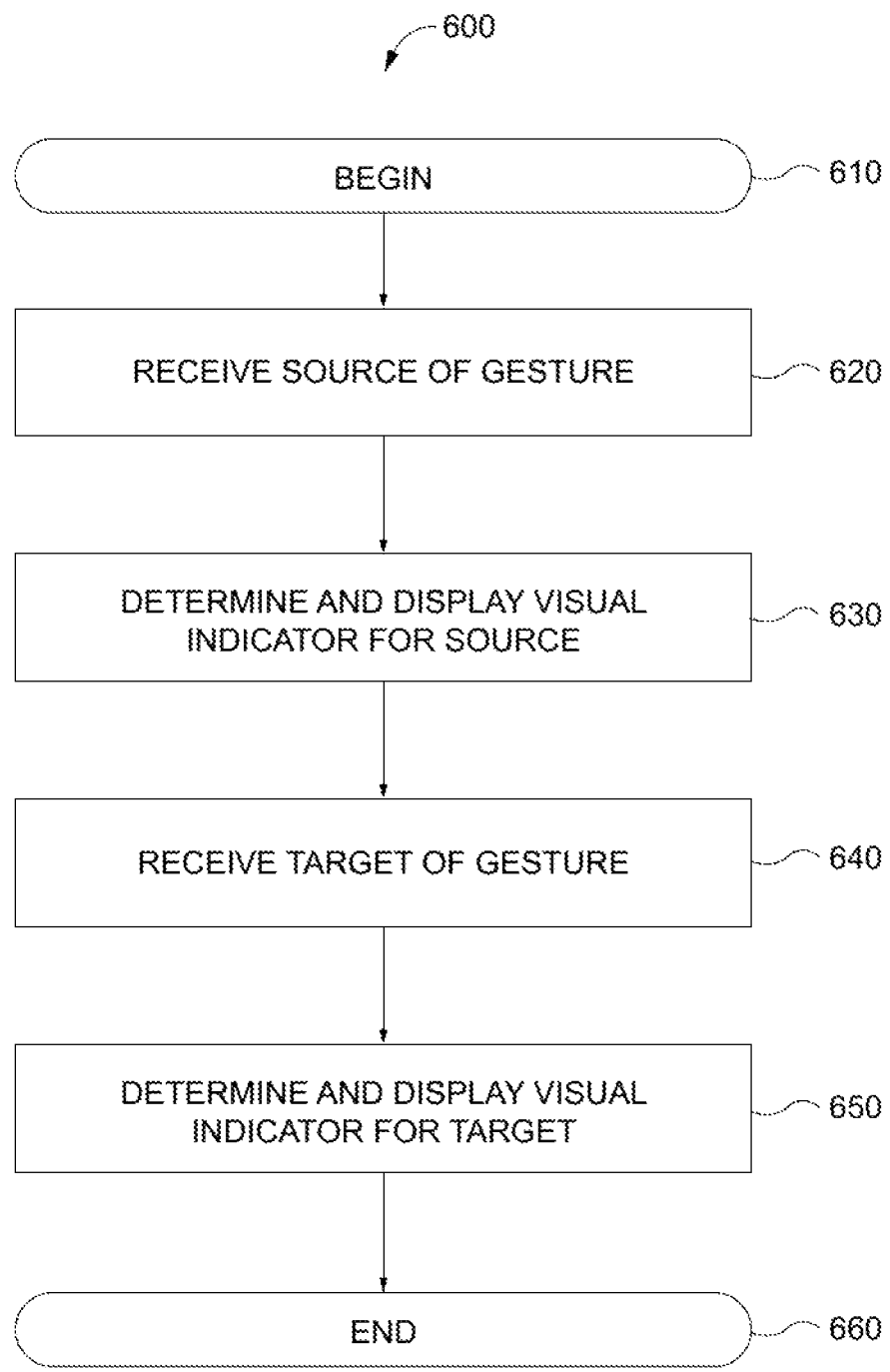
FIG. 6 is a flowchart of a method for displaying visual indicators for gesture sources and gesture targets in one embodiment according to the present invention.

FIG. 6 is a flowchart of method 600 for displaying visual indicators for gesture sources and gesture targets in one embodiment according to the present invention. Implementations or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, a source of a gesture is received. ADF 100 may receive one or more keypresses, mouse events, or the like to determine that a portion of a chart is the source of a gesture. In step 630, a visual indicator is determined and displayed for the source of the gesture. A visual indicator for a source of a gesture may include a change in size, shape, color, hue, contrast, highlighting, or the like or the addition or subtraction of information, such as adding annotations or the like.

In step 640, a target of a gesture is received. ADF 100 may receive one or more keypresses, mouse events, or the like to determine that a portion of a chart is the target of a gesture. In step 650, a visual indicator is determined and displayed for the target of the gesture. As above, a visual indicator for a target may include a change in size, shape, color, hue, contrast, highlighting, or the like or the addition or subtraction of information, such as adding annotations or the like. Other visualizations, transformations, animations or the like may be used to indicate whether a portion of a chart is a source or target of a gesture. FIG. 6 ends in step 660.

Figure 7:
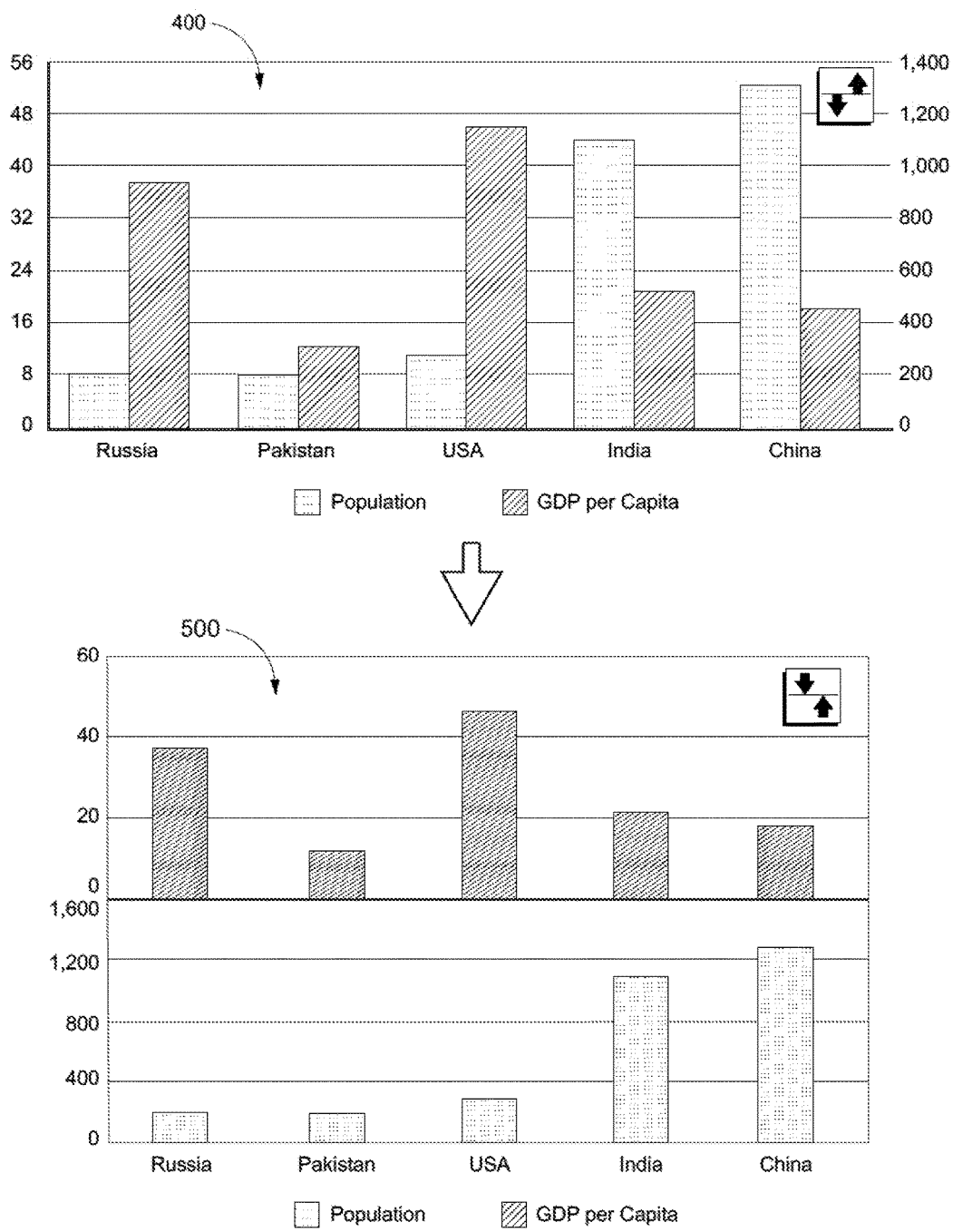
FIG. 7 illustrates how a chart user can cycle between various layouts arriving at one layout of a dual-Y chart in one embodiment.

Other than using dragging gestures, in certain embodiments, ADF 100 provides user interface elements that allow the user to split and unsplit a chart. For example, using a button that is located at the corner of a plot area associated with chart 400, a chart user can cycle between various layouts arriving at chart 500 as shown in FIG. 7. In order that the button does not obscure the data points, the button may only appear when a user hovers over a predetermined portion of the plot area.

Dual-Y Resize

Figure 8:
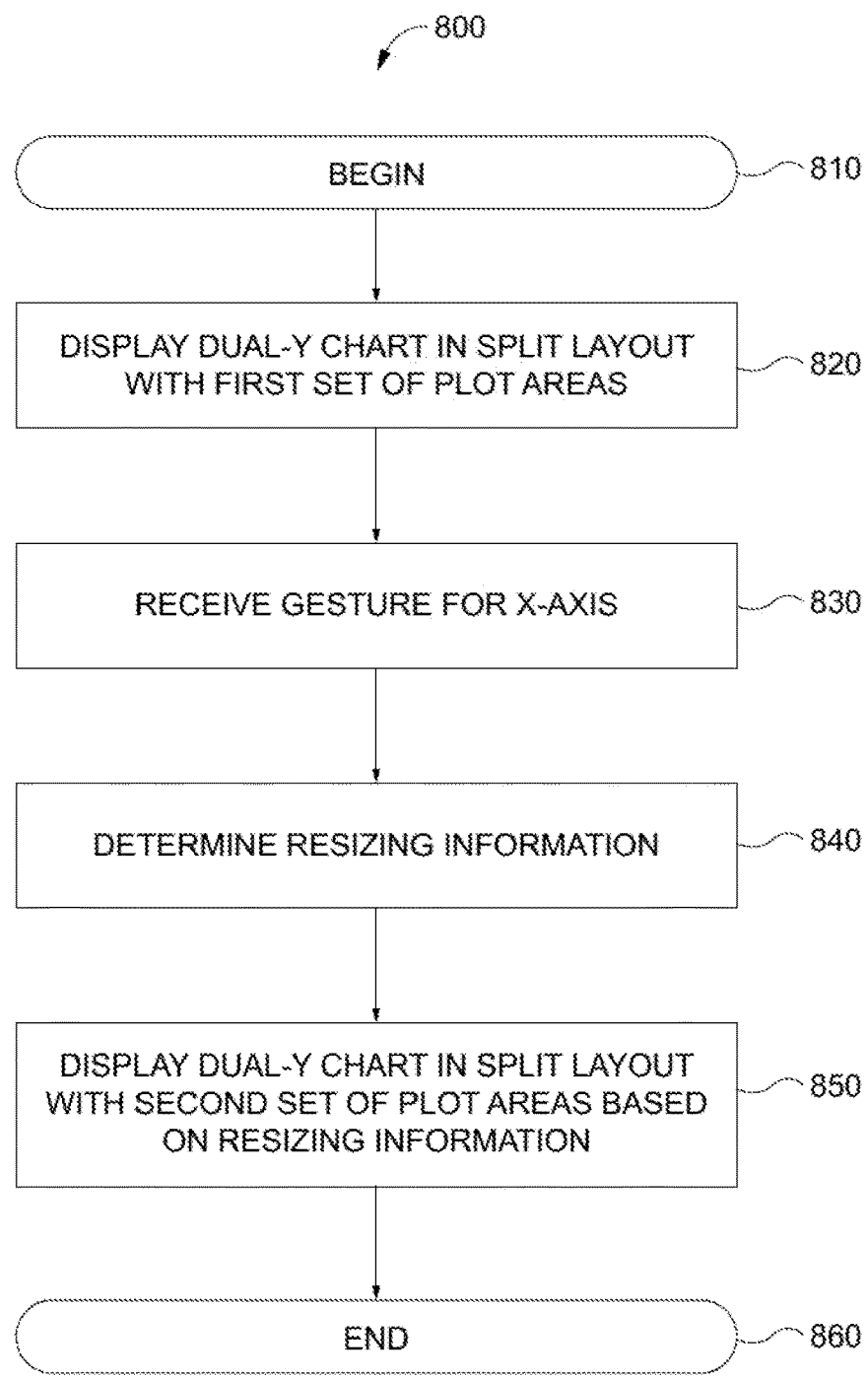
FIG. 8 is a flowchart of a method for resizing dual-Y charts in one embodiment according to the present invention.

FIG. 8 is a flowchart of method 800 for resizing dual-Y charts in one embodiment according to the present invention. Implementations or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In step 820, a dual-Y chart is displayed in a split layout with a first set of plot areas. A plot area associated with a first Y-axis may be sized to be substantially equal to a plot area of a second Y-axis. In certain embodiments, the plot areas of each Y-axis is different. In step 830, a gesture is received for the X-axis. ADF 100 may receive one or more keypresses, mouse events, or the like to determine that a portion of a chart associated with the X-axis is the target of a gesture. The gesture for the X-axis may include a change the vertical position of a line, the axis labels, axis title, or other user interface elements associated with the X-axis. Accordingly, a chart user can drag the shared X-axis up or down to resize the two plot areas.

In step 840, resize information is determined. The resize information can include height information of one or more plot areas, width information of one or more plot areas, scale information of one or more plot areas, or the like. In step 850, the dual-Y chart is displayed in the split layout with a second set of plot areas based on the resizing information. Data within each plot area may be redrawn and scaled within a resized plot area. FIG. 8 ends in step 860.

Figure 9:
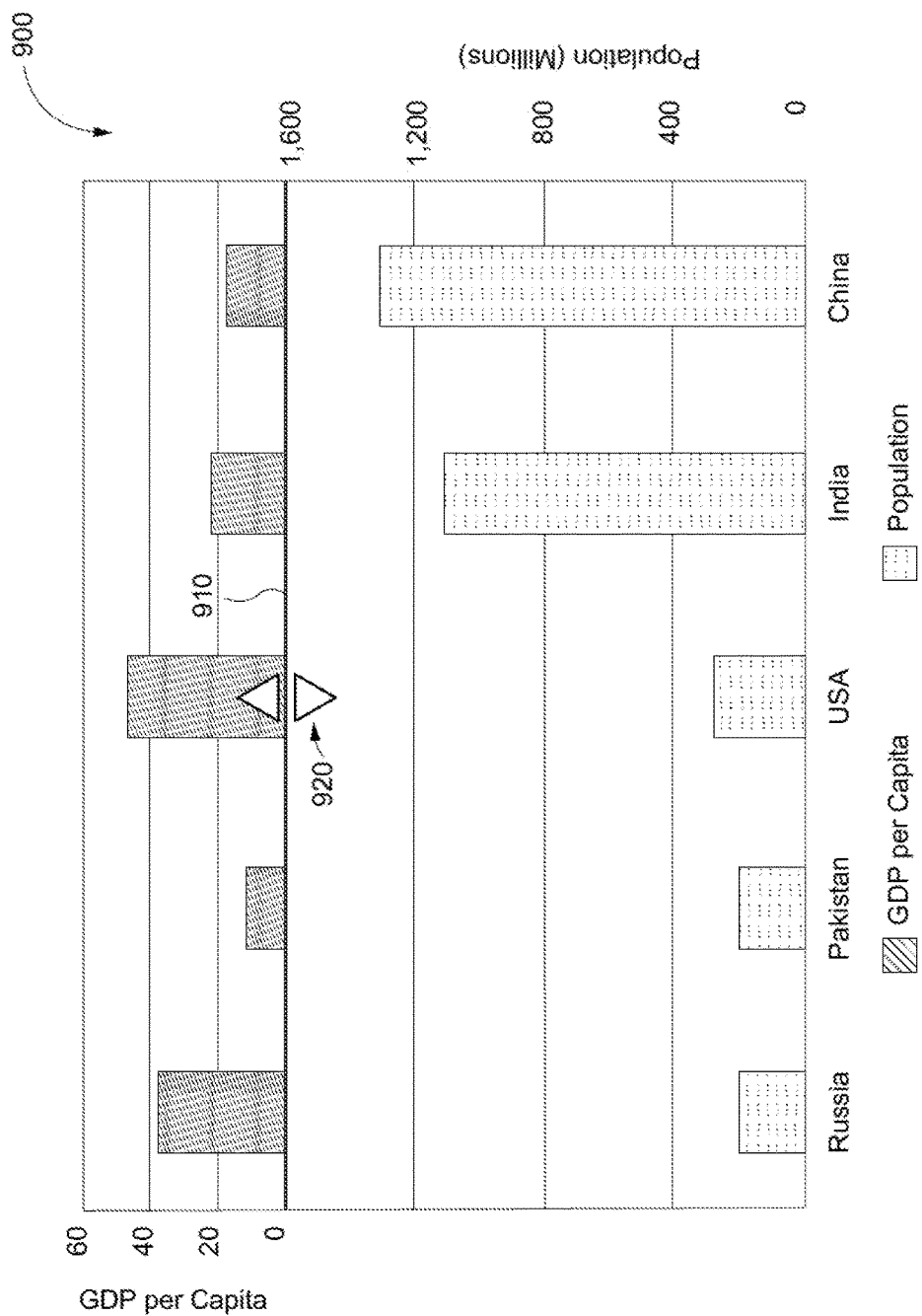
FIG. 9 is an illustration of one or more visual indicators for a dual-Y chart where a user can drag the shared X-axis up or down to resize two plot areas in one embodiment.

FIG. 9 is an illustration of one or more visual indicators for chart 900 where a user can drag the shared X-axis up or down to resize two plot areas in one embodiment. In this example, once a chart user selects or otherwise grabs the X-axis, ADF 100 may visually distinguish the X-axis from before. ADF 100 may also include one or more visual references of direction toward which the user is able to guide the X-axis. In this example, chart 900 includes a bolded line 910 representative of the shared X-axis. Allowed motion of the shared X-axis for resizing is shown by one or more visual indicators as set of arrows 920.

Conclusion

Figure 10:
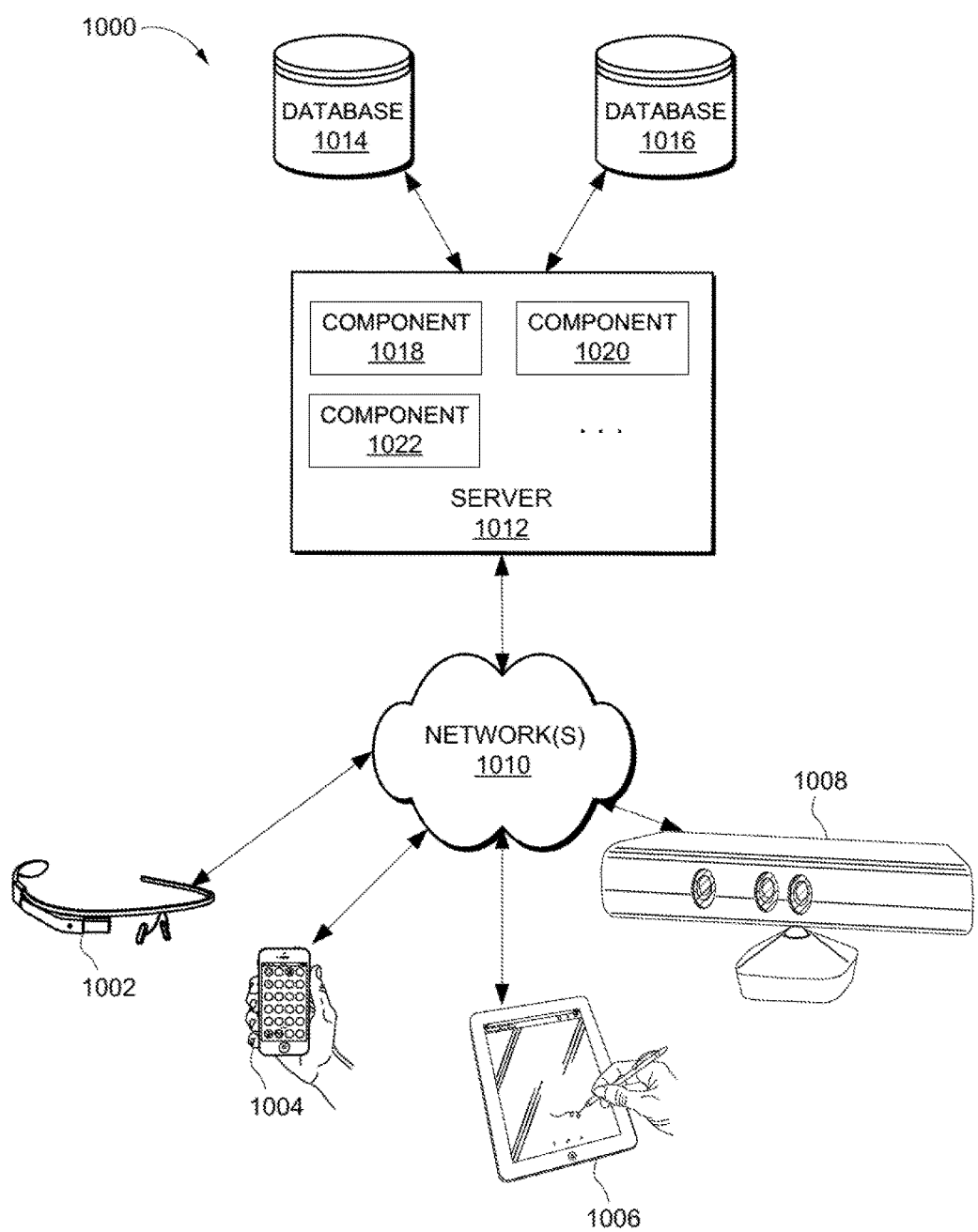
FIG. 10 depicts a simplified diagram of a distributed system for implementing one of the embodiments.

FIG. 10 depicts a simplified diagram of distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model or a Platform as a Serves (PaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, software components 1018, 1020, and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 1002, 1004, 1006, and/or 1008 can be general purpose personal computers including, by way of example, personal computers and/or laptop computers running various versions of Microsoft Windows®, Apple Macintosh®, and/or Linux operating systems. Client computing devices 1002, 1004, 1006, and/or 1008 can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
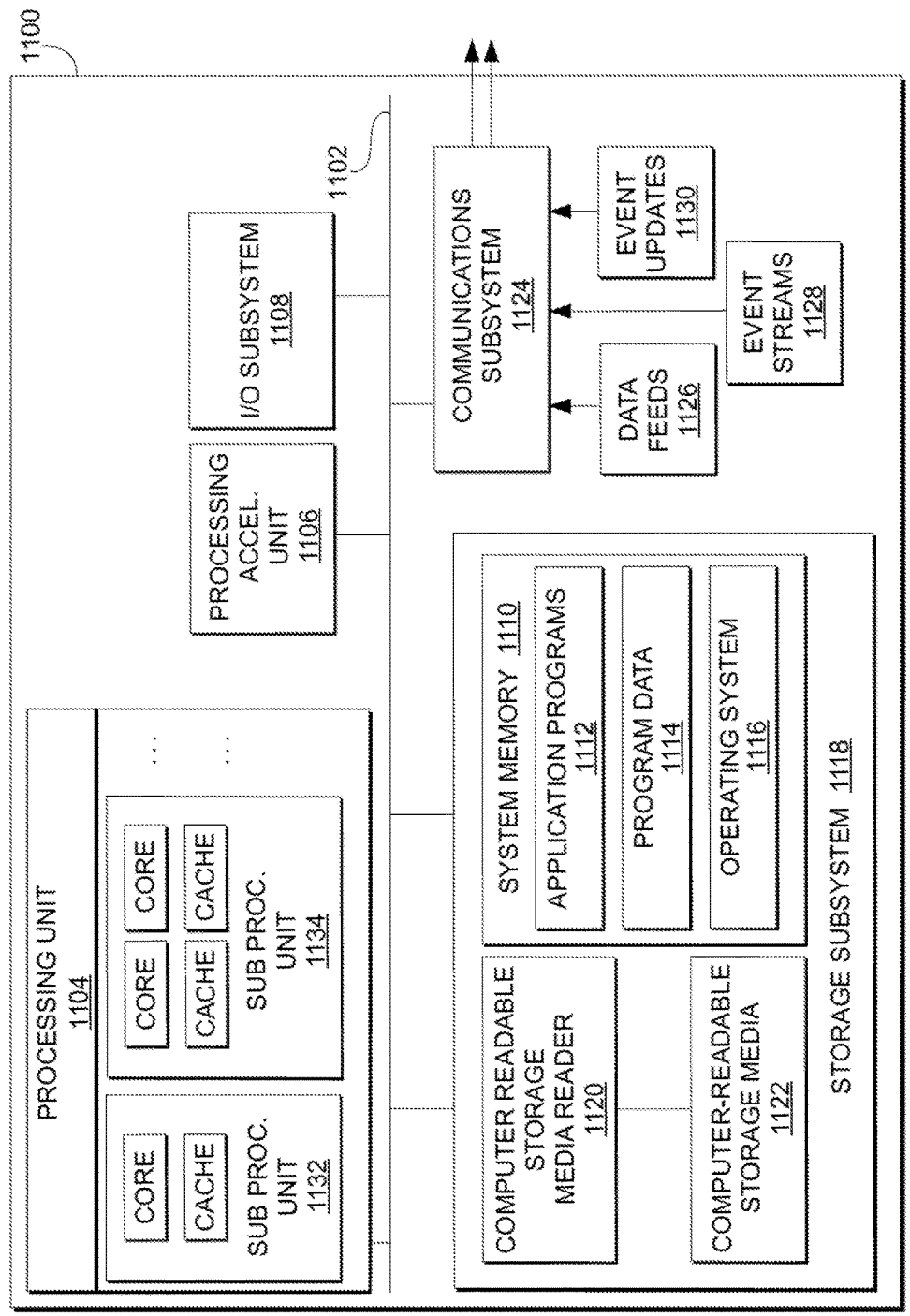
FIG. 11 illustrates an exemplary computer system, in which various embodiments of the present invention may be implemented

FIG. 11 illustrates an exemplary computer system 1100, in which various embodiments of the present invention may be implemented. The system 1100 may be used to implement any of the computer systems described above. As shown in FIG. 11, computer system 1100 includes bus subsystem 1102 and processing unit 1104 that communicates with a number of peripheral subsystems via bus subsystem 1102. These peripheral subsystems may include processing acceleration unit 1106, I/O subsystem 1108, storage subsystem 1118, and communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    rendering, by a computer, a chart having a first chart layout for a related series of data including a first data set and a second data set, wherein
        the first chart layout is a split bipolar chart layout including: (i) a first plot area with a shared X-axis and a first y-axis associated with the first data set, (ii) the second plot area with the shared X-axis and a second y-axis associated with the second data set, (iii) the shared X-axis is rendered between the first plot area and the second plot area, wherein the first plot area is below the shared X-axis and the second plot area is above the shared X-axis, (iv) the first data set is growing from the shared X-axis in a direction extending below the shared X-axis, and (v) the second data set is growing from the shared X-axis in a direction extending above the shared X-axis;
    receiving, by the computer, a gesture performed by a user with respect to the chart having the first chart layout;
    determining, by the computer, a source of the gesture with respect to the chart as the first Y-axis of the first plot area or the second Y-axis of the second plot area;
    determining, by the computer, a target of the gesture with respect to the chart as the second plot area or the first plot area;
    determining, by the computer, a second chart layout for the first data set and the second data set based on the source and the target of the gesture, wherein when the source of the gesture is the first y-axis and the target is the second plot area or the source of the gesture is the second y-axis and the target is the first plot area, the second chart layout is determined as a joined dual-y chart with both the first data set and the second data set growing in the same direction, and the second chart layout has a plot area with the shared X-axis, the first y-axis associated with the first data set, and the second y-axis associated with the second data set; and
    rendering, by the computer, the chart with the second chart layout.

2. The method of claim 1, further comprising generating, by the computer, a visual indicator in response to determining the source or the target of the gesture.

3. The method of claim 1, further comprising:
    receiving, at the computer, a another gesture with respect to the chart having the second chart layout;
    determining, by computer, resizing information based on the second gesture; and
    rendering, by the computer, the chart with a third chart layout generated based on the resizing information.

4. A non-transitory computer-readable medium storing a computer program product having program instructions which when executed by a processor of a computer causes the processor to:
    render a chart having a first chart layout for a related series of data including a first data set and a second data set, wherein
        the first chart layout is a split bipolar chart layout including: (i) a first plot area with a shared X-axis and a first y-axis associated with the first data set, (ii) the second plot area with the shared X-axis and a second y-axis associated with the second data set, (iii) the shared X-axis is rendered between the first plot area and the second plot area, wherein the first plot area is below the shared X-axis and the second plot area is above the shared X-axis, (iv) the first data set is growing from the shared X-axis in a direction extending below the shared X-axis, and (v) the second data set is growing from the shared X-axis in a direction extending above the shared X-axis;
    receive a gesture performed by a user with respect to the chart having the first chart layout;
    determine a source of the gesture with respect to the chart as the first Y-axis of the first plot area or the second Y-axis of the second plot area;
    determine a target of the gesture with respect to the chart as the second plot area or the first plot area;
    determine a second chart layout for the first data set and the second data set based on the source and the target of the gesture, wherein when the source of the gesture is the first y-axis and the target is the second plot area or the source of the gesture is the second y-axis and the target is the first plot area, the second chart layout is determined as a joined dual-y chart with both the first data set and the second data set growing in the same direction, and the second chart layout has a plot area with the shared X-axis, the first y-axis associated with the first data set, and the second y-axis associated with the second data set; and render the chart with the second chart layout.

5. The non-transitory computer-readable medium of claim 4, wherein the computer program product further causes the processor to generate a visual indicator in response to determining the source or the target of the gesture.

6. The non-transitory computer-readable medium of claim 4, wherein the computer program product further causes the processor to:

receive a another gesture with respect to the chart having the second chart layout;

determine resizing information based on the second gesture; and render the chart with a third chart layout generated based on the resizing information.

7. A system comprising:

a hardware processor; and a memory storing a set of instructions which when executed by the processor causes the processor to:

render a chart having a first chart layout for a related series of data including a first data set and a second data set, wherein the first chart layout is a split bipolar chart layout including: (i) a first plot area with a shared X-axis and a first y-axis associated with the first data set, (ii) the second plot area with the shared X-axis and a second y-axis associated with the second data set, (iii) the shared X-axis is rendered between the first plot area and the second plot area, wherein the first plot area is below the shared X-axis and the second plot area is above the shared X-axis, (iv) the first data set is growing from the shared X-axis in a direction extending below the shared X-axis, and (v) the second data set is growing from the shared X-axis in a direction extending above the shared X-axis;

receive a gesture performed by a user with respect to the chart having the first chart layout;

determine a source of the gesture with respect to the chart as the first Y-axis of the first plot area or the second Y-axis of the second plot area;

determine a target of the gesture with respect to the chart as the second plot area or the first plot area;

determine a second chart layout for the first data set and the second data set based on the source and the target of the gesture, wherein when the source of the gesture is the first y-axis and the target is the second plot area or the source of the gesture is the second y-axis and the target is the first plot area, the second chart layout is determined as a joined dual-y chart with both the first data set and the second data set growing in the same direction, and the second chart layout has a plot area with the shared X-axis, the first y-axis associated with the first data set, and the second y-axis associated with the second data set; and render the chart with the second chart layout.

8. The system of claim 7, wherein the set of instructions which when further executed by the processor causes the processor to generate a visual indicator in response to determining the source or the target of the gesture.

9. The system of claim 7, wherein the set of instructions which when further executed by the processor causes the processor to:

receive a another gesture with respect to the chart having the second chart layout;

determine resizing information based on the second gesture; and render the chart with a third chart layout generated based on the resizing information.

\* \* \* \* \*

UNITED STATES PATENT AND TRADEMARK OFFICE
CERTIFICATE OF CORRECTION

PATENT NO. : 10,007,356 B2
APPLICATION NO. : 15/285368
DATED : June 26, 2018
INVENTOR(S) : Ho et al.

Page 1 of 1

It is certified that error appears in the above-identified patent and that said Letters Patent is hereby corrected as shown below:

On the Title Page

Column 1, under Notice, Line 3, after "0 days." delete "days.".

Column 2, under Other Publications, Line 1, delete "Acton" and insert -- Action --, therefor.

On page 2, Column 1, under Other Publications, Line 1, delete "Allowenoe" and insert -- Allowance --, therefor.

In the Specification

In Column 4, Line 3, after "implemented" insert -- . --.

Signed and Sealed this
Second Day of April, 2019

Andrei Iancu
*Director of the United States Patent and Trademark Office*